(12) United States Patent
Tsang et al.

(10) Patent No.: US 7,412,534 B2
(45) Date of Patent: Aug. 12, 2008

(54) SUBSCRIPTION CONTROL PANEL

(75) Inventors: Audrey Y. Tsang, San Francisco, CA (US); Matt Fukuda, San Francisco, CA (US); Dan J. Wascovich, San Francisco, CA (US); Edward Stanley Ott, IV, Palo Alto, CA (US); Nathanael Joe Hayashi, Piedmont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 303 days.

(21) Appl. No.: 11/346,847

(22) Filed: Feb. 2, 2006

(65) Prior Publication Data

US 2007/0088832 A1    Apr. 19, 2007

Related U.S. Application Data

(60) Provisional application No. 60/750,724, filed on Dec. 14, 2005, provisional application No. 60/722,600, filed on Sep. 30, 2005.

(51) Int. Cl.
*G06F 15/16*   (2006.01)
*G06F 12/00*   (2006.01)

(52) U.S. Cl. .................... 709/231; 709/226

(58) Field of Classification Search ............ 709/223, 709/224, 226, 229, 250, 219, 231; 707/10, 707/100
See application file for complete search history.

(56) References Cited

U.S. PATENT DOCUMENTS

| | | | |
|---|---|---|---|
| 5,948,061 | A | 9/1999 | Merriman et al. |
| 6,285,985 | B1 | 9/2001 | Horstmann |
| 6,374,260 | B1 | 4/2002 | Hoffert et al. |
| 6,385,592 | B1 | 5/2002 | Angles et al. |
| 6,751,673 | B2 | 6/2004 | Shaw |
| 6,874,018 | B2 | 3/2005 | Wu |
| 6,922,702 | B1 | 7/2005 | Jensen et al. |
| 6,931,434 | B1 | 8/2005 | Donoho et al. |
| 6,944,611 | B2 | 9/2005 | Flank et al. |

(Continued)

FOREIGN PATENT DOCUMENTS

CA    2326342 A1    10/1999

(Continued)

OTHER PUBLICATIONS

Notification of Transmittal of the International Search Report and the Written Opinion of the International Searching Authority, or the Declaration dated Feb. 15, 2007 (PCT/US2006/037965).

(Continued)

*Primary Examiner*—Zarni Maung
(74) *Attorney, Agent, or Firm*—Greenberg Traurig, LLP; James J. DeCarlo

(57) ABSTRACT

Systems and methods are provided for centrally managing subscriptions to feeds accessible at different locations on a network. A subscription server is provided that a user can log in to from any of the user's rendering devices and use to manage subscriptions to feeds, including subscribing to feeds, listening to episodes of feeds, downloading episodes to a rendering device, and rating and reviewing episodes. The user's history of actions with respect to feeds is tracked and stored on the subscription server. The user can then access this history via user interfaces generated by the subscription server to determine what actions the user has performed in the past.

5 Claims, 10 Drawing Sheets

U.S. PATENT DOCUMENTS

| | | |
|---|---|---|
| 2002/0069218 A1 | 6/2002 | Sull et al. |
| 2002/0072965 A1 | 6/2002 | Merriman et al. |
| 2002/0108115 A1* | 8/2002 | Palmer ........................ 725/50 |
| 2002/0124098 A1 | 9/2002 | Shaw |
| 2002/0194200 A1 | 12/2002 | Flank et al. |
| 2003/0023564 A1 | 1/2003 | Padhye et al. |
| 2003/0028433 A1 | 2/2003 | Merriman et al. |
| 2003/0088778 A1 | 5/2003 | Lindqvist et al. |
| 2003/0174154 A1* | 9/2003 | Yukie et al. .................. 345/700 |
| 2003/0177503 A1 | 9/2003 | Sull et al. |
| 2003/0212759 A1 | 11/2003 | Handong |
| 2004/0125124 A1 | 7/2004 | Kim et al. |
| 2004/0126021 A1 | 7/2004 | Sull et al. |
| 2004/0128317 A1 | 7/2004 | Sull et al. |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2005/0038702 A1 | 2/2005 | Merriman et al. |
| 2005/0193010 A1* | 9/2005 | DeShan et al. ........... 707/104.1 |
| 2005/0193408 A1 | 9/2005 | Sull et al. |
| 2005/0193425 A1 | 9/2005 | Sull et al. |
| 2005/0203927 A1 | 9/2005 | Sull et al. |
| 2005/0204385 A1 | 9/2005 | Sull et al. |
| 2005/0210145 A1 | 9/2005 | Kim et al. |
| 2005/0289468 A1* | 12/2005 | Kahn et al. .................. 715/738 |
| 2006/0064716 A1 | 3/2006 | Sull et al. |
| 2006/0116924 A1 | 6/2006 | Angles et al. |
| 2006/0129917 A1* | 6/2006 | Volk et al. .................. 715/513 |
| 2006/0230021 A1* | 10/2006 | Diab et al. ...................... 707/3 |
| 2006/0248209 A1* | 11/2006 | Chiu et al. .................. 709/231 |
| 2006/0265503 A1* | 11/2006 | Jones et al. ................. 709/227 |
| 2006/0288329 A1* | 12/2006 | Gandhi et al. ............... 717/114 |
| 2007/0055754 A1* | 3/2007 | Robbin et al. ............... 709/223 |
| 2007/0077921 A1 | 4/2007 | Hayashi et al. |
| 2007/0078712 A1 | 4/2007 | Ott |
| 2007/0078713 A1 | 4/2007 | Ott et al. |
| 2007/0078714 A1 | 4/2007 | Ott et al. |
| 2007/0078832 A1 | 4/2007 | Ott et al. |
| 2007/0078876 A1 | 4/2007 | Hayashi et al. |
| 2007/0078883 A1 | 4/2007 | Hayashi et al. |
| 2007/0078884 A1 | 4/2007 | Ott |
| 2007/0078896 A1 | 4/2007 | Hayashi et al. |
| 2007/0078897 A1 | 4/2007 | Hayashi et al. |
| 2007/0078898 A1 | 4/2007 | Hayashi et al. |
| 2007/0079321 A1 | 4/2007 | Ott |
| 2007/0094346 A1* | 4/2007 | Nussey ........................ 709/217 |
| 2007/0100959 A1* | 5/2007 | Eichstaedt et al. .......... 709/217 |
| 2007/0118657 A1* | 5/2007 | Kreitzer et al. .............. 709/227 |

FOREIGN PATENT DOCUMENTS

| | | |
|---|---|---|
| EP | 1307838 A1 | 5/2003 |
| KR | 20040074623 A | 8/2004 |
| KR | 2005084756 A | 8/2005 |
| WO | WO9952056 A1 | 10/1999 |
| WO | WO 0213121 A1 | 2/2002 |
| WO | WO02054698 A2 | 7/2002 |
| WO | WO2007041073 A1 | 4/2007 |
| WO | WO2007041074 A1 | 4/2007 |
| WO | WO2007041260 A1 | 4/2007 |

OTHER PUBLICATIONS

Notification Concerning Transmittal of International Preliminary Report on Patentability (Chapter I of The Patent Cooperation Treaty) dated Apr. 10, 2008 (PCT/US2006/037965).

Notification of Transmittal of the International Search Report and the Written Opinion of the International Searching Authority, or the Declaration dated Jan. 26, 2007 (PCT/US2006/037318).

Notification Concerning Transmittal of International Preliminary Report on Patentabiity (Chapter I of The Patent Cooperation Treaty) dated Apr. 1, 2008 (PCT/US2006/037318).

Notification of Transmittal of the International Search Report and the Written Opinon of the International Searching Authority, or the Declaration dated Jan. 25, 2007 (PCT/US2006/037319).

Notification Concerning Transmittal of International Preliminary Report on Patentability (Chapter I of The Patent Cooperation Treaty) dated Apr. 10, 2008 (PCT/US2006/037319).

* cited by examiner

```xml
<rss version="2.0" xmlns:dc="http://purl.org/dc/elements/1.1/" xmlns:itunes="http://www.itunes.com/DTDs/Podcast-1.0.dtd">
<channel>
<title>GameSpot presents The HotSpot</title>
<link>http://www.gamespot.com</link>
<description>GameSpot editors recap the hottest news and trend in the gaming industry from the past week!</description>
<generator>GameSpot</generator>
<image>
<title>GameSpot</title>
<url>http://img.gamespot.com/gamespot/shared/promos/misc/gs_logo.gif</url>
<width>135</width>
<height>44</height>
</image>
<itunes:link rel="image" type="video/jpeg" href="http://img.gamespot.com/gamespot/images/2005/features/hotspot/shared/hotspot_logo.jpg" />
<language>en-us</language>
<copyright>2005 CNET Networks, Inc.</copyright>
<itunes:category text="Arts & Entertainment">
<itunes:category text="Games" />
</itunes:category>
<itunes:explicit>no</itunes:explicit>
<itunes:subtitle />
<itunes:summary>GameSpot editors recap the hottest news and trends in the gaming industry from the past week!</itunes:summary>
<itunes:author>GameSpot.com</itunes:author>
<itunes:owner>
<itunes:name />
<itunes:email />
</itunes:owner>
<item>
<title>GameSpot presents The HotSpot - 7/20/05</title>
<itunes:author>GameSpot.com</itunes:author>
<itunes:subtitle />
<itunes:summary>Join Executive Editor Greg Kasavin, Senior Editor Jeff Gerstmann, Features Editor Bob Colayco, and Features Producer Rich Gallup as they discuss the Hot Coffee brouhaha, the ups and downs of gaming stocks, inflation in the land of Azeroth, and more!</itunes:summary>
<link>http://www.gamespot.com/features/6129513/index.html</link>
<guid>http://download.gamespot.com/d4/free/podcast/hotspot_072005.mp3</guid>
<comments />
<description>Join Executive Editor Greg Kasavin, Senior Editor Jeff Gerstmann, Features Editor Bob Colayco, and Features Producer Rich Gallup as they discuss the Hot Coffee brouhaha, the ups and downs of gaming stocks, inflation in the land of Azeroth, and more!</description>
<dc:creator>GameSpot.com</dc:creator>
<dc:date>2005-07-20T18:00Z</dc:date>
<category>News</category>
<itunes:category text="Arts & Entertainment">
<itunes:category text="Games" />
</itunes:category>
<itunes:explicit>no</itunes:explicit>
<itunes:duration>14:55</itunes:duration>
<itunes:keywords>video games, gaming, GameSpot, Hot Coffee</itunes:keywords>
<pubDate>Wed, 20 Jul 2005 11:00:00 GMT</pubDate>
<enclosure url="http://download.gamespot.com/d4/free/podcast/hotspot_072005.mp3" length="14345195" type="audio/mpeg" />
</item>
...
</channel>
</rss>
```

SUBSCRIPTION CONTROL PANEL

RELATED APPLICATIONS

This application claims the benefit of U.S. Provisional Application No. 60/722,600, filed Sep. 30, 2005, which application is hereby incorporated herein by reference. This application also claims the benefit of U.S. Provisional Application No. 60/750,724, filed Dec. 14, 2005, which application is hereby incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Multimedia data files, or media files, are data structures that may include audio, video or other content stored as data in accordance with a container format. A container format is a file format that can contain various types of data, possible compressed a standardized and known manner. The container format allows a rendering device to identify, and if necessary, interleave, the different data types for proper rendering. Some container formats can contain only audio data, while other container formation can support audio, video, subtitles, chapters and metadata along with synchronization information needed to play back the various data streams together. For example, an audio file format is a container format for storing audio data. There are many audio-only container formats including known in the art including WAV, AIFF, FLAC, WMA, and MP3. In addition, there are now a number of container formats for use with combined audio, video and other content including AVI, MOV, MPEG-2 TS, MP4, ASF, and RealMedia to name but a few.

Media files accessible over a network are increasingly being used to deliver content to mass audiences. For example, one emerging way of periodically delivering content to consumers is through podcasting.

Podcasting is a method of publishing digital media, typically audio programs, via the Internet, allowing users to subscribe to a series of new files (e.g., MP3 audio files) as they become available over time. The word "podcasting" became popular in late 2004, largely due to automatic downloading of audio onto portable players or personal computers. Podcasting is distinct from other types of online media delivery because of its subscription model, which uses a "feed" (such as RSS, discussed below, and Atom) to monitor for and/or deliver a file. A feed in this context refers to an electronic means, such as a file containing a list of media files, that can be easily interpreted to identify new files in the list as the files are added over time. Thus, one is said to subscribe to a feed because as new files are added to the list, the subscriber is notified of the new file and, in some cases, the new file is automatically delivered to the subscriber.

Podcasting enables independent producers to create self-published, syndicated media, such as "radio shows," and gives broadcast news, radio, and television programs a new distribution method. Listeners may subscribe to feeds using "podcatching" software (a type of aggregator), which periodically checks for and downloads new content automatically. Most podcatching software enables the user to copy podcasts to portable music players. Most digital audio player or computer with audio-playing software can play podcasts.

From the earliest RSS-enclosure tests, feeds have been used to deliver video files as well as audio. By 2005 some aggregators and mobile devices could receive and play video, although the "podcast" name remains most associated with audio. Other names are sometimes used for casting other forms of media, such as blogcasting for text and vcasting or vodcasting for video. For the purposes of this application, podcast is used in its most general sense to refer to a feed of new files in any format (e.g., .MP3, .MPEG, .WAV, .JPG) and containing any content (e.g., text-based, audible, visual or some combination) that can be subscribed to. Also, for the purposes of this discussion an individual podcast feed may be alternately referred to as a series. Each distinct new file in a series or feed may be referred to as an individual episode of the series.

Podcasting is supported by underlying feed formats, of which RSS is but one example. RSS is a family of XML file formats for web syndication used by (among other things) news websites and weblogs. The abbreviation is alternately used to refer to the following recognized standards: Rich Site Summary (RSS 0.91); RDF Site Summary (RSS 0.9 and 1.0); and Really Simple Syndication (RSS 2.0).

Feed formats, such as the RSS formats, often allow the feed creator (referred to as the publisher) to include web content or summaries of web content together with links to the full versions of the content, and other meta-data. This information may be associated with different episodes of the feed, thus allowing an easy way to provide at least some summary information to the subscriber so that a subscriber does not have to render each episode to determine if it contains information of interest. This information may be delivered within an XML feed file, a webfeed, an RSS stream, or RSS channel.

The technology behind podcasting allows a client to subscribe to websites that have provided RSS feeds or feeds in other formats; these are typically sites that change or add content regularly. To use this technology the client needs some type of aggregation service or aggregator. The aggregator allows a client to subscribe to the podcasts that the client wants to monitor or to get updates (i.e. future media files in the feed) on. Unlike typical subscriptions to pulp-based newspapers and magazines, your RSS subscriptions are free, but they typically only provide a line or two of each article or post along with a link to the media file that contains the episode (e.g., the full text article, audio file or video file).

In addition to facilitating syndication, a feed allows a website's frequent readers to track updates on the site using an aggregator.

Feeds, including RSS feeds, are widely used by the weblog community to share the latest episodes' headlines or their full text, and even attached multimedia files. In mid 2000, use of RSS for podcasting text spread to many major news organizations, including Reuters, CNN and the BBC, until under various usage agreements, providers allow other websites to incorporate their "syndicated" headline or headline-and-short-summary feeds. Feeds are now used for many purposes, including marketing, bug-reports, or any other activity involving periodic updates or publications.

A program known as a feed reader or aggregator can check feeds, such as RSS-enabled webpages, on behalf of a user and display any updated articles that it finds. It is now common to find RSS feeds on major web sites, as well as many smaller ones. Client-side readers and aggregators are typically constructed as standalone programs or extensions to existing programs like web browsers. Such programs are available for various operating systems.

Podcasting has become a very popular and accepted media delivery paradigm. This success has caused the number and variety of podcasts available to clients to grow exponentially. Potential podcast consumers are now confronted with the problems of how to find podcasts, how to organize and manage their podcast subscriptions; and how to listen to episodes efficiently and easily. Podcast publishers are also confronted with problems including how to effectively market their podcasts, how to generate income from their podcasts, how to easily create and disseminate podcasts, how to support different feed formats and device needs, and how to manage bandwidth and storage costs.

Currently client-side readers must download some or all of an episode to the rendering device before the subscriber can begin to render the episode. This requires a substantial amount of bandwidth, storage space on the rendering device, and is a potential security risk to the rendering device.

SUMMARY OF THE INVENTION

Various embodiments of the present invention relate to systems and methods for centrally managing subscriptions to feeds located and/or accessible at different locations on a network. A subscription server is provided that a user can log in to from any of the user's rendering devices and use to manage subscriptions to feeds, including subscribing to feeds, listening to episodes of feeds, downloading episodes to a rendering device, and rating and reviewing episodes. The user's history of actions with respect to feeds is tracked and stored on the subscription server. The user can then access this history via user interfaces generated by the subscription server to determine what actions the user has performed in the past.

In one example (which example is intended to be illustrative and not restrictive), the present invention may be considered a method for managing subscriptions to feeds. The method includes receiving, at a server computer, a subscription request from a user via a first rendering device. The subscription request is a request to receive notifications of episodes added to the feed in the future, the feed accessible at a remote computing device. In response to the request, subscription data is stored in a subscription data store accessible to the server computer in a way that the subscription data is associated with the user. The subscription data may identify the feed, which is accessible at the remote computing device, as a feed subscribed to by the user. After storage, the server transmits to the user's rendering device at least some subscription data for display to the user identifying the feed and indicating that the user is subscribed to the feed.

In one example (which example is intended to be illustrative and not restrictive), the present invention may be considered a graphical user interface generated by a server for display to a user via a rendering device. The graphical user interface displays a first list of feeds which identify one or more feeds accessible at remote computing devices that the user has subscribed to via a previous request to the server. The graphical user interface also includes a render control associated with at least one feed identified in the first list. User selection of the render control causes an episode of the feed, which is located on a remote computing device, to be rendered on the rendering device and render data to be saved on the server indicating that the user has rendered the episode. The graphical user interface also includes, associated with at least of the feeds in the first list, a notification indicating that an episode has been added to the feed since a previous generation of the graphical user interface by the server for display to the user.

In one example (which example is intended to be illustrative and not restrictive), the present invention may be considered a system for subscribing to feeds. The system includes a subscription engine on a subscription server adapted to communicate with rendering devices over a network. The subscription engine is adapted to receive feed subscription requests from a user via a first rendering device in communication with the server. The system also includes a subscription data store in communication with the server. The subscription data store contains subscription information associated with the user, wherein the subscription information identifies one or more feeds (which are actually located at, stored on, or accessible via remote computing devices on the network) that the user is currently subscribed to. In the system, each subscription request is a request to monitor the feed for the addition of new episodes, the new episodes located at one or more remote computing devices.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings:

FIG. 3 shows the contents, in .XML, of an exemplary RSS feed file in accordance with an embodiment of the present invention;

FIG. 7 is an embodiment of a user interface for a server-based subscription control panel.

FIG. 8 is an embodiment of a subscription history user interface for a server-based subscription control panel.

FIG. 9 is an embodiment of a tag history user interface for a server-based subscription control panel.

FIG. 12 is an alternative embodiment of a "My Subscriptions" user interface for a server-based subscription control panel.

DETAILED DESCRIPTION OF EMBODIMENTS OF THE INVENTION

In general, the present invention relates to a system and method for delivering media over a network and for enhancing a user's experience in experiencing the media that is transferred over the network. In view of the aforementioned shortcomings in the art, it would be advantageous if a system was available wherein a user had complete and unfettered access to all podcasts that he or she has subscribed to, regardless of what particular user device that the subscription is delivered to, and a means for managing those subscriptions easily.

Reference will now be made in detail to illustrative embodiments of the present invention, examples of which are shown in the accompanying drawings.

Figure 1:
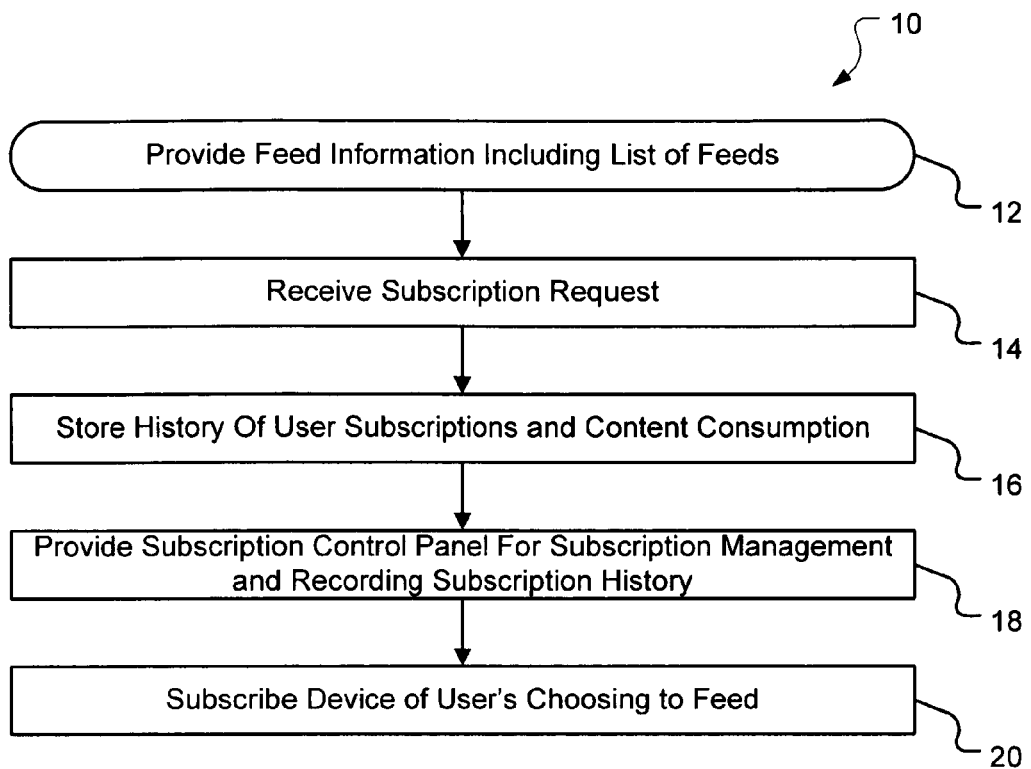
FIG. 1 is a high-level illustration of an embodiment of a high-level method of managing subscriptions to feeds on remote computing devices using a subscription server.

FIG. 1 is a high-level illustration of an embodiment of a method of managing subscriptions to feeds on remote computing devices using a subscription server. In the embodiment, a subscription server, in response to a user request, provides a list of feeds to that can be subscribed to in provide feed operation 12. In the embodiment, the user request may be received from a computing device in communication with the subscription server. The user's computing device may also be a rendering device, i.e., a device capable of rendering a media file, media data streamed from the subscription server or media data obtained from some other source.

The provide feed operation 12 may include generating and transmitting a graphical user interface (GUI) to the user's computing device from which the user may select to subscribe to a feed or listen to an episode of a feed, as will be described in greater detail below.

Through user selections of controls (such as buttons) on the GUI, the user's computing device transmits a request to the subscription server which is received in a receive feed request operation 14. The receive feed request operation 14 may include receiving a request to subscribe to a feed, which may cause the subscription server to transmit information (such as a .pcast file) to the user's rendering device that causes the rendering device to subscribe directly to the feed. In an embodiment, the receive feed request operation 14 may also include receiving other requests related to any feed including already subscribed feeds, such as to unsubscribe to a feed, to listen to an episode of a feed or to provide additional information about a feed to the subscription server such as review and or a rating of a feed or episode.

In response to the receive feed request operation 14, the subscription server stores the user's requests, selections, provided information, etc. in a subscription data store in a way that associates the information with the particular user in a store subscription history operation 16. For example, a user may have first logged into the subscription server by providing a user name and a password. Using this information, the subsequent information received in user requests can be associated with the user. Thus, the subscription server stores a history of the user's actions with respect to the user's consumption of feeds and episodes.

Using this information, the subscription server is then able to provide to the user a feed control panel in a provide subscription control operation 18. The feed control panel allows the user to review and manage the user's current subscriptions and subscription history, e.g., the history of actions related to feeds such as subscription requests, listening and downloading of episodes, rating and reviewing, etc. A user may access the subscription control panel periodically to determine if any new episodes have been added to any currently subscribed feeds. Furthermore, from the control panel the user may render new episodes and easily find and re-render past episodes from the user's history. In addition, the user's consumption history may be made available to the user so that the user is aware of what episodes the user has already consumed.

The subscription control panel may also be used on an ongoing basis to manage the subscriptions, by subscribing to additional feeds, remove subscriptions listed in the subscription control panel, or unsubscribing to current subscriptions. For example, in subscribe operation 20, a user has selected via the subscription control panel user interface to subscribe to a selected feed. In the subscribe operation 20, the user may then be prompted as to what device the user wishes to have subscribed to the feed. In response to a user selection of a device, the subscription server performs the actions necessary to cause the selected device to subscribe to the selected feed. For example, if the selected device is a user's personal rendering device, then a .pcast file (discussed in greater detail below) may be generated and transmitted to the rendering device thereby causing the rendering device to subscribe to the feed by adding the feed to the rendering device's subscription list. Alternatively, the user may select to have the subscription added to the user's account on the subscription server, e.g., by receiving a request to add the feed to the user's "My Yahoo!" account. In this embodiment, the subscription server updates the user's account information to indicate subscription to the selected feed.

Figure 2:
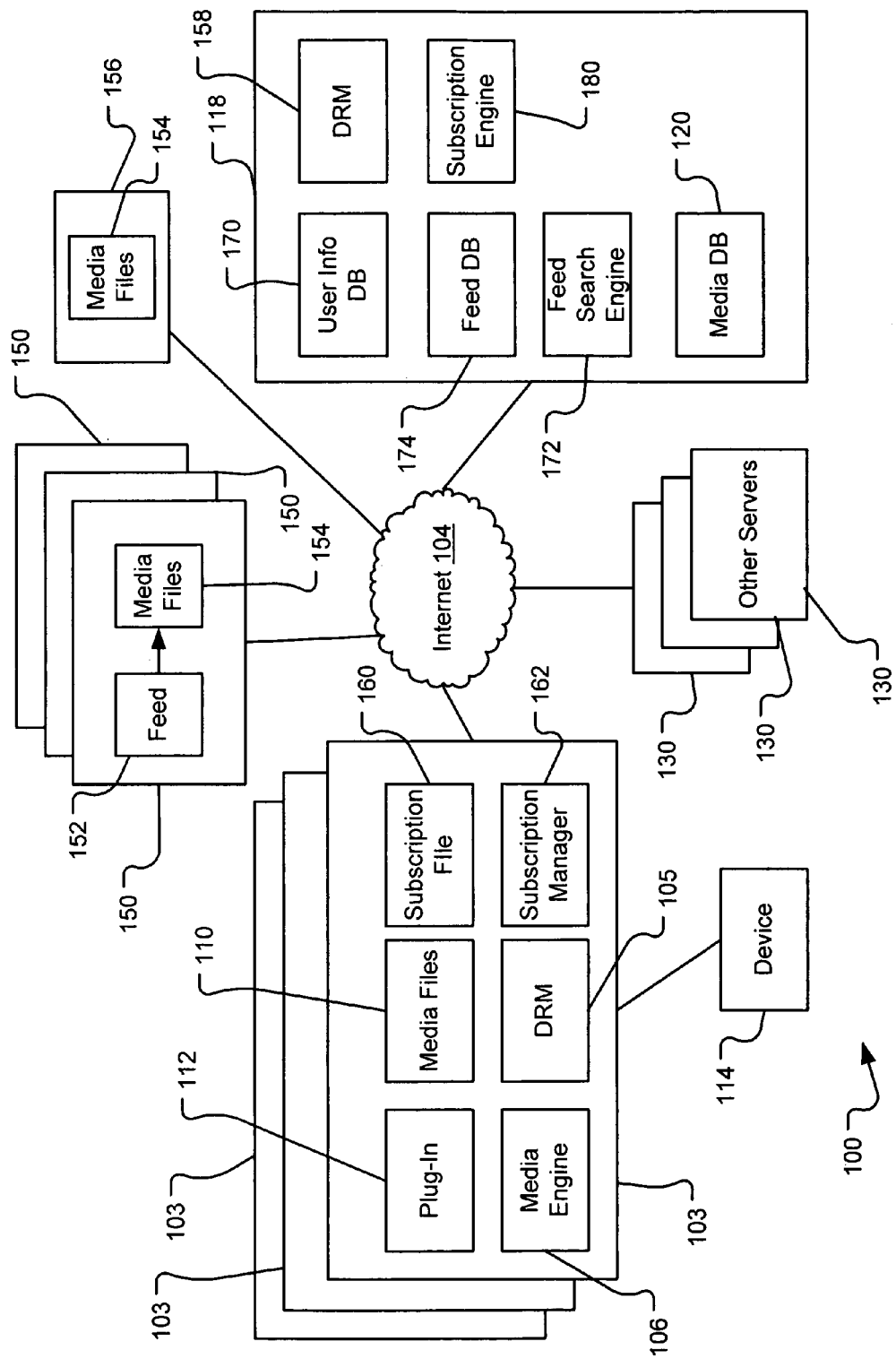
FIG. 2 is a schematic illustrating an exemplary network architecture according to one embodiment of the present invention.

FIG. 2 illustrates an architecture of one embodiment of the present invention in schematic form. As can be seen in FIG. 2, a system 100 according to one embodiment of the present invention is shown. In general the system 100 allows users to experience, share, render and otherwise utilize different media. Although numerous exemplary embodiments will be discussed in terms of music and/or audio files, this invention can also be utilized with any form of audio, video, digital or analog media content, as well as any other media file type now known or to become known.

Each user utilizes a processor 103, such as personal computer (PC), web enabled cellular telephone, personal digital assistant (PDA) or the like, coupled to the Internet 104 by any one of a number of known manners. Furthermore, each processor 103 preferably includes an Internet browser (not shown), such as that offered by Microsoft Corporation under the trade name INTERNET EXPLORER, or that offered by Netscape Corp. under the trade name NETSCAPE NAVIGATOR, or the software or hardware equivalent of the aforementioned components that enable networked intercommunication between users and service providers and/or among users. Each processor also includes a media engine 106 that, among other functions to be further described, provides the ability to render media data or convert information or data into a perceptible form and manage media related information or data so that user may personalize their experience with various media. Media engine 106 may be incorporated into processor 103 by a vendor of processor 103, or obtained as a separate component from a media engine provider or in some other art recognized manner. As will be further described below, it is contemplated that media engine 106 may be a software application, or a software/firmware combination, or a software/firmware/hardware combination, as a matter of design choice, that serves as a central media manager for a user and facilitates the management of all manner of media files and services that the user might wish to access either through a computer or a personal portable device or through network devices available at various locations via a network. As used herein, the term media file is used generically to refer to an item containing media data, as well as any associated metadata and/or network location information for that item.

Processor 103 also may include storage of local media files 110 and/or other plug-in programs that are run through or interact with the media engine 106. Processor 103 also may be connectable to one or more devices 114 such as a compact disc player and/or other external media file player, commonly referred to as an MP3 player, such as the type sold under the trade name IPOD by Apple Computer, Inc., that is used to portably store and play media files.

Additionally, processor 103 may contain Digital Rights Management software (DRM) 105 that protects the copyrights and other intellectual property rights of the user's media files by enabling secure distribution and/or preventing or hampering illegal distribution of the media files. In one embodiment, DRM 105 encrypts or decrypts the media files for controlled access by authorized users, or alternatively for marking the content with a digital watermark or similar method so that the content can not be freely distributed. Media engine 106 preferably uses the DRM information to ensure that the media files being experienced through media engine 106 are not copied to or shared with users that are unauthorized to listen to or view the content.

The processor 103 includes the software necessary to subscribe to podcasts. In the embodiment shown, the processor 103 includes a subscription file 160. A subscription file 160 may be written in XML or may conform to some standard subscription file format such as Outline Processor Markup Language (OPML). The subscription file 160 maintains information that identifies what podcasts the user has subscribed to. The subscription file 160 may include a list of feeds 152 and the feed locations.

The processor 103 may also include a subscription manager 162. The subscription manager 162 can perform the podcatching functions of an aggregator and can periodically poll the feeds identified in the subscription file 160 to determine if new episodes of the podcast are available. Upon determination that a new episode is available, the subscription manager 162 may notify the user or may automatically download the episode to the processor.

As will be discussed in greater detail below the system 100 also includes subscription server 118. In addition to serving media over the Internet 104 to the user, subscription server 118 also preferably includes a media database 120, which stores or communicates with storage of various metadata attributes of each particular piece of media. Database 120 may be distributed over multiple servers or locations. Other servers 130 make other content and services available and may provide administrative services such as managing user logon, service access permission, digital rights management, and other services made available through a service provider. Although some of the embodiments of the invention are described in terms of music, embodiments can also encompass any form of streaming or non-streaming media including but not limited to news, entertainment, sports events, web page or perceptible audio or video content. It should be also be understood that although the present invention is described in terms of media content and specifically audio content, the scope of the present invention encompasses any content or media format heretofore or hereafter known.

The subscription server 118 also includes a database 170 of user information. The user information database 170 includes information about users that is collected from users or generated by the subscription server 118 as the user interacts with the subscription server 118. In one embodiment, the user information database 170 includes user information such as user name, gender, e-mail and other addresses, user preferences, etc. that the user may provide to the subscription server 118. In addition, the server 118 may collect information such as what podcasts the user has subscribed to, what searches the user has performed, how the user has rated various podcasts, etc. In effect, any information related to the user and the podcasts that user subscribes to that is available to the subscription server 118 may be stored in the user information database 170.

For example, in one embodiment a user may use the subscription server as a central manager of the user's subscriptions, instead of having multiple devices 103, each subscribed to different feeds. In this embodiment, all subscription information associated with the user is stored in the user information database 170, including the list of feeds that the user is currently subscribed to. This subscription information is updated over time to reflect user actions such as subscribing to new feeds, unsubscribing to feed, and listening to various episodes of feeds.

The user information database 170 may also include information about a user's devices 114. The information allows the subscription server 118 to identify the device and differentiate it from the processor 103. Furthermore, it is anticipated that a single user may have multiple different processors 103 and each processor 103 may be associated with different information. For example, a user may subscribe to a news podcast on a mobile device such as a smart phone 103 or similar Internet connected mobile device 103 and may subscribe to a gaming podcast on a home computer 103. The user information database 170 contains all this information. In one embodiment, the user information database 170 may include the same information contained in the processor's subscription file 160 for each processor 103 associated with the user. The user information database 170 may even include one or more files in the OPML file format for each user.

In the embodiment shown, the subscription server 118 includes a feed database 174. The feed database 174 may include a list of podcasts known to the server 118. This list may be periodically refreshed as the server 118 searches for new feeds 152 and for feeds 152 that have been removed from access to the internet 104. Such a feed database 174 may not be necessary if the searching ability of the server 118 is sufficient to quickly provide user with updated and accurate feed information in response to a user search. The feed database 174 may include all of the information provided by the feed 152. In addition, the feed database 174 may include other information generated by the subscription server 118 or by users. Thus, the feed database 174 may contain information not known to or generated by the publisher of the feed 152.

In an embodiment, the feed database 174 includes additional information regarding feeds 152 in the form of "tags." A tag is a keyword chosen by a person accessing the subscription server 118 to describe a particular feed 152. The tag can be any word or combination of key strokes. Each tag submitted to the subscription server may be recorded in the feed database 172 and associated with the feed the tag describes. Tags may be associated with a particular feed 152 (e.g., a series tag) or associated with a specific media file 154 within the feed 152 (e.g., an episode tag). Tags will be discussed in greater detail below.

Since tags can be any keyword, a typical name for a category, such as "science" or "business," may also be used as a tag and in an embodiment the initial tags for a feed are automatically generated by taking the category designations from a feed and using them as the initial tags for the feed. However, note that tags are not a hierarchical category system that one "drills down" through. Tags are not hierarchically related as is required in the typical categorization scheme. Tags are also cumulative in that the number of users that identify a series or an episode with a specific tag are tracked. The relative importance of the specific tag as an accurate description of the associated content (i.e., series or episode) is based on the number of users that associated that tag with the content.

In an embodiment, consumers of feeds 152 are allowed to provide information to be associated with feeds or particular episodes. Thus the user after consuming data may rate an episode, say on a scale of 1-5 stars, write a review of the episode, and enter tags to be associated with the episode. All this consumer-generated data may be stored in the feed database 174 and associated with the appropriate episode for use in future searches.

In one embodiment, the search engine 172 creates a new entry in the feed database 174 for every feed 152 it finds. Initially, the entry contains some or all of the information provided by the feed 152. An automatic analysis may or may not be performed to match the feed 152 to known tags based on the information provided in the feed 152. For example, in an embodiment some RSS feeds include a category element and the categories listed in that element for the feed are automatically used as the initial tags for the feed. While this is not the intended use of the category element, it is used as an initial tag as a starting point for the generation of more accurate tags for the feed. Note that searches on terms that appear in the feed 152 will return that feed as a result, so it is not necessary to provide tags to a new entry for the search to work properly. Initially no ratings information or user reviews are associated with the new entry. The manager of the subscription server may solicit additional information from the publisher such as the publisher's recommended tags and any additional descriptive information that the publisher wishes to provide but did not provide in the feed 152 itself.

The feed database may also include such information as reviews of the quality of the feeds, including reviews of the series as a whole and reviews specific to each episode in a given feed 152. The review may be a rating such as a "star" rating and may include additional descriptions provided by users.

In addition to maintaining information specific to series and individual episodes within the series, the feed database 174 may also include information associated with publishers of the feeds, sponsors of the feeds, or people in the feeds.

The subscription server 118 includes a feed search engine 172. The feed search engine 172 provides a graphical user interface to users allowing the user to search for and subscribe to feeds 152 using the subscription server 118. The graphical user interface may be an .HTML page served to the processor 103 for display to the user via a browser. Alternatively the graphical user interface may be presented to the user through some other software on the processor 103. An example of a graphical user interface presented to a user by a browser is discussed with reference to FIG. 3. Through the graphical user interface, the feed search engine 172 receives user search criteria. The search engine 172 then uses these parameters to identify feeds 152 that meet the user's criteria. The search may involve an active search of Internet, a search of the feed database 174, or some combination of both 174. The search may include a search of the descriptions provided in the feed 152 of the series and each particular episode in the series. The search may also include a search of the tags and other information associated with feeds 152 listed in the feed database 174, but not provided by the feeds themselves. The results of the search are then displayed to the user via the graphical user interface.

In one embodiment of the present invention, similar to the DRM software 105 located on the user's processor 103, the subscription server may maintain its own DRM software 158 which tracks the digital rights of media files located either in the media database 120 or stored on a user's processor. Thus, for example, before the subscription server 118 streams or serves up or transfers any media files to a user, it validates the rights designation of that particular piece of media and only serves streams or transfers the file if the user has the appropriate rights.

The system 100 also includes a number of servers 150 that publish podcasts. That is, the servers 150 include one or more feeds 152, such as RSS feeds, that are accessible through the network, in this case the Internet 104. The feeds 152, as will be described in greater detail below, include information about the feed (e.g., series information) as well as information about the various media files 154 (i.e., episodes) of the feed 152. The feed 152 also identifies the media files 154 so that they can be retrieved by a subscription manager on a processor 103. The media file 154 may reside on the podcast server 150 with the feed 152, or may be located on another server 156.

As illustrated in FIG. 2, each user's processor 103, the subscription server 118 and podcast servers 150, as well as the other servers 130, 156 are communicatively connected via the Internet 104. In alternate embodiments, different components of the system may be communicatively coupled differently, for example each may be coupled directly to each other wirelessly or by a local or wide area network (WAN) or the like. Additionally, functional components can be distributed so that certain functions of the media engine may be performed at subscription server 118, or vice versa, or distributed in modular fashion for operation at various locations throughout the system 100. Thus, the description herein of a function or component being associated with a particular device or component or location is merely exemplary.

The search engine also provides users with additional functionality and convenience not previously available. The user interface provided by the search engine to the user's processor 103 allows the user to subscribe to a displayed feed (via a subscribe button), listen to an episode of a displayed feed (via listen button), and obtain the complete information on the feed (via clicking on the hyperlinked title) from the same interface. A user need not know where the feed resides on the Internet. Furthermore, the user does not need to explicitly direct his computer to access the publisher's site to subscribe, listen or obtain additional information on a feed.

User selection of a subscribe button may result in the subscription file 160 on the user's processor 103 being updated, such as by the transmission of a ".pcast" file to the processor for execution by the subscription manager 162. User selection of a subscribe button will also cause data regarding the user's subscription to be stored in a subscription data store, such as in the user information database 170. Likewise, user selection of a listen button or any other interface element regarding feeds and episodes may also be stored in the subscription data store to provide an accurate history of the user's consumption of feeds, episodes and media files in general.

In an embodiment of the present invention, the subscription server 118 also includes a subscription engine 180. The subscription engine 180 can communicate with rendering devices, such as processors 103, over the network 104. The subscription engine is capable of receiving feed subscription requests from a user via a processor 103 and in response store data regarding subscriptions into a subscription data store. In one embodiment, subscription information is stored in the user information database 170 which acts as the subscription data store. Alternatively, a separate subscription database (not shown) may be used, which contains only subscription data and user data.

The information stored in the subscription data store will include, for each user, information identifying the feeds currently subscribed to by that user, metadata information associated with each those feeds and their constituent episodes (such as the published metadata about series and episodes, location of each file) and usage information such as whether the user has requested a particular episode to be downloaded to his processor 103 via a command received by the subscription server 118.

Note that in an embodiment all of the information in the subscription server is information generated via the user's interaction with the subscription server. Thus, any user actions directly with a remote server 154 regarding a podcast subscription will not be captured by the subscription server 118. While this may allow the information in the subscription server 118 and that on the user's processor(s) to diverge, it also allows a user with one or more processors 103 that do not support the ability to subscribe to feeds (e.g., a processor 103 that does not have a subscription manager 162 or a subscription file 160) to use the subscription engine 180 on the subscription server 118 to provide this functionality. The onus is then on the user to update the subscription history on the subscription server to reflect any changes made to a subscription using a local subscription manager 162.

One benefit of this embodiment is that a user would no longer need a local subscription manager 162. Another benefit is that the user no longer needs to maintain different subscriptions on different devices, as all subscription management is centralized. In fact, in an embodiment, the user may select to have all subscriptions managed at the subscription server and elect to have no .pcast files or the like ever transmitted to any of the user's rendering devices. This greatly simplifies the user's rendering devices as all the user's processor 103 would need in order for the user to subscribe to feeds and render episodes is a network connection to and the appropriate software to interact with the subscription engine 180 (e.g., a browser with a media player plugin on a web enabled cellular phone). The user would also have centralized access to subscriptions and historical information pertaining to all past and current subscriptions.

In an alternative embodiment, the user's subscription manager 162 on the processor 103 may be adapted to interact with the subscription server 118 so that the user's subscription file 160 and the subscription information in the subscription data store on the server are periodically synchronized.

FIG. 3 is an embodiment of an feed 152 conforming to the RSS standard and written in .XML. Shown in FIG. 3 are the .XML declarations that identify the .XML specification and allow an .XML execution engine to interpret the remainder of the file, which is the first line of the document.

The first line shown in the feed 152 includes a header section that identifies the RSS standard and the document type definition to be used when interpreting the feed 152. In this case it also identifies an ITUNES standard published by Apple Computer.

The next line begins the channel section with the </channel> statement or tag. The channel element contains metadata that describe the channel itself, telling what the channel is and who created it. The channel is a required element that includes the name of the channel, its description, its language, and a URL. The URL is normally used to point to the channel's source of information. The channel element contains the remaining channel tags, which describe the channel and allows it to be displayed in HTML. The title can be treated as a headline link with the description following. The Channel Language definition allow aggregators to filter news feeds and gives the rendering software the information necessary to display the language properly.

For example, you can include nine optional tags in a RSS 0.91 specification/channel definition. Some examples are PICS Rating, Copyright Identifier, Publication Date, and Webmaster. You can use these additional elements for a variety of purposes. For example, sites that aggregate content can use this additional meta information to allow users to filter news feeds on the basis of Platform for Internet Content Selection (PICS) ratings.

In the embodiment shown, the channel, that is the feed 152 or series, is given the title "GameSpot presents The HotSpot". A link to www.gamespot.com is provided along with a short description applicable to the feed 152. The publisher is identified as Gamespot.

The image element is an optional element that is usually used to include the logo of the channel provider. The image's title, URL, link, width, and height tags allow rendering devices to translate the file into HTML. The title tag is normally used for the image's ALT text. In the embodiment shown an image file is identified as the file "gs_logo.gif" and its URL is provided.

In the embodiment shown, after the image element some additional elements are provided that are associated with the ITUNES standard for RSS feeds. These elements include the identification of an additional image associated with the feed 152, a language designation, a category and subcategory designation, a summary (that is identical to the channel description) and an author designation.

After the ITUNES element, the first item element is shown. Items usually form the dynamic part of an RSS file and identifies an episode of the feed 152. While channel, image, and text input elements create the channel's identity and typically stay the same over long periods of time, items are rendered as news headlines, and the channel's value depends on their changing fairly frequently. The item title is normally rendered as a headline that links to an associated media file 154 whose URL is provided by the item link. The item description is commonly used for either a summary of the content or for commentary on the content. For example, news feed channels use the description to highlight the content of news articles, usually on the channel owner's site, and Web log channels use the description to provide commentary on a variety of content, often on third-party sites.

In FIG. 3, only the first item is shown. That item includes the title of the episode—"GameSpot present The HotSpot—Jul. 20, 2005", the author of the episode, a description of the episode—"Join Executive Editor Greg Kasavin, Senior Editor Jeff Gerstmann, Features Editor Bob Colayco, and Features Producer Rich Gallup as they discuss the Hot Coffee brouhaha, the ups and downs of gaming stocks, inflation in the land of Azeroth, and more!", a creation date and, importantly, an identifier that identifies the location of the media file, in this case by a URL to the MP3 file "hotspot_072005.mp3."

Depending on the specification used, the amount and type of information regarding the feed 152 and its episodes may vary. However, because the specification is declared in the feed 152, all information can be extracted and interpreted appropriately if the interpreter has knowledge of the specification.

Figure 4:
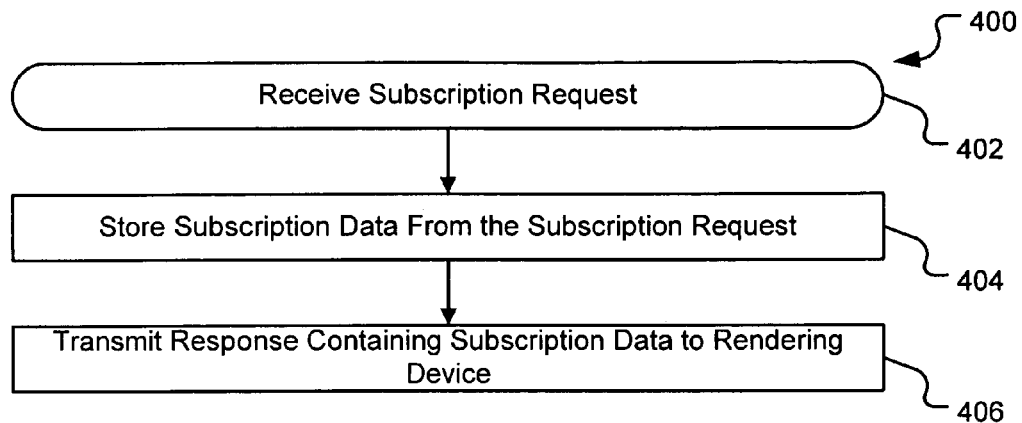
FIG. 4 is a flowchart of an embodiment of a method of subscribing to a feed on remote computing devices using a subscription server.

FIG. 4 is a flowchart of an embodiment of a method of subscribing to a feed on remote computing devices using a subscription server. In the embodiment, the user sends a subscription request which is received by the subscription server in a receive subscription request operation 402. The request may be sent by the user via a computing device, which may or may not also be a rendering device. However, in the embodiment discussed below, it will be assumed that the user's computing device is also a rendering device capable of rendering media content to the user in some manner.

The subscription request may be a request to subscribe to an identified feed. As discussed above, the feed may be located anywhere on a network that is accessible to the rendering device and the subscription server. In addition, the location of the episodes of a feed may also be located anywhere on a network that is accessible to the rendering device and the subscription server and need not be co-located with the feed itself. The request may be generated by the user's rendering device in response to a user selection of a control on a GUI provided by the subscription server to the rendering device, e.g., by a mouse click on a button icon on a webpage showing search results of the server's search for podcasts matching some search criteria.

In the embodiment, a request to subscribe to an identified feed can be considered a request for the subscription server to monitor the feed for the addition of new episodes in the future. When it is determined that a new episode has been added, a notification may be transmitted to the user, such as via an e-mail alert message. Alternatively, upon the next accessing of the subscription control panel by the user, a notification may be presented in some way such by highlighting the feed or feeds with new content. How the user is notified may be determined by user selection through a menu provided by subscription control panel and may include options such as e-mail alerts, text messages or voice messages sent to the user's phone.

In an alternative embodiment, a request to listen to an identified episode of a feed, regardless of whether the feed is currently subscribed to or not, is also a subscription request.

In response to the subscription request, the subscription server stores a record of the request in a subscription data store in a store subscription data operation 404. In the store subscription data operation 404, the record may consist only of selected information taken from the request, such as the feed information and date of subscription, which is stored as subscription data and associated with the user. Additional information may also be obtained from the server's data regarding the feed, such as the feed's location, which may also be stored in the subscription data store.

The subscription server after the store subscription data operation 404 then confirms that the user has subscribed by transmitting a response back to the user's rendering device in a transmit response operation 406. The response may include some of the original subscription data, such as the name of the feed. In one embodiment, the response may be a simple confirmatory notification alerting the user of a successful subscription operation. In another embodiment, the response may also include information, such as a .pcast file, that is interpretable by the rendering device to cause the rendering device to subscribe directly to the feed. For example, in response to receipt of the subscription request, the subscription server may transmit a prompt to the user in which the user may select to have the user's rendering device subscribe to the feed. If the user does select to have the rendering device subscribe to the feed, the .pcast file or other subscribing information may be generated and transmitted to the user's rendering device. The subscription may occur when the user expressly requests the rendering device to interpret the information or it may occur automatically upon receipt of the information from the subscription server. Alternatively, the prompt may also allow the user to choose to have the subscription server subscribe and not subscribe any of the user's rendering devices. In this embodiment, the user's information in the user information database is updated and no subscribing information or .pcast file need be returned to the user's device.

In an embodiment, the response transmitted in the response operation 406 is a GUI showing the subscription control panel. The subscription control panel GUI, discussed in greater detail with reference to FIG. 7, below, displays to the user a list of feeds that the server is aware of that the user is currently subscribed to. From this GUI, the use may select to render episodes, rate episodes or feeds and review episodes or feeds. Any user selections from this GUI, e.g., a user selection to render an episode, are then stored as additional subscription data associated with the user.

Figure 5:
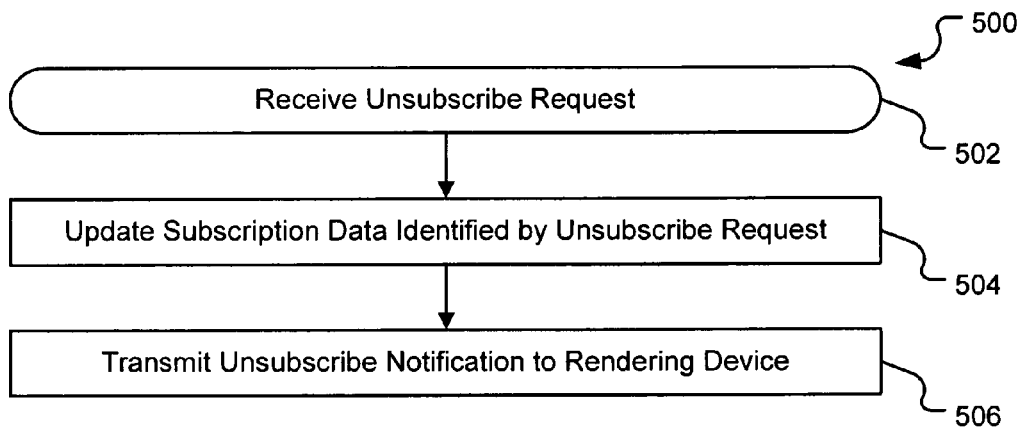
FIG. 5 is a flowchart of an embodiment of a method of unsubscribing to a feed on a remote computing device using a subscription server.

FIG. 5 is a flowchart of an embodiment of a method of unsubscribing to a feed on a remote computing device using a subscription server. In the embodiment, A user has previously subscribed to a feed such as via the method 400 of FIG. 4 and, in the unsubscribe method 500, an unsubscribe request is received by the subscription server from the user in a receive unsubscribe request 502. The request need not be received from any particular computing device, as long as the request can be associated with the user. Thus, it is possible for a user to subscribe to a feed with a first device, such as a PC computer at the user's home, and at a later date unsubscribe using a different device.

Figure 7:
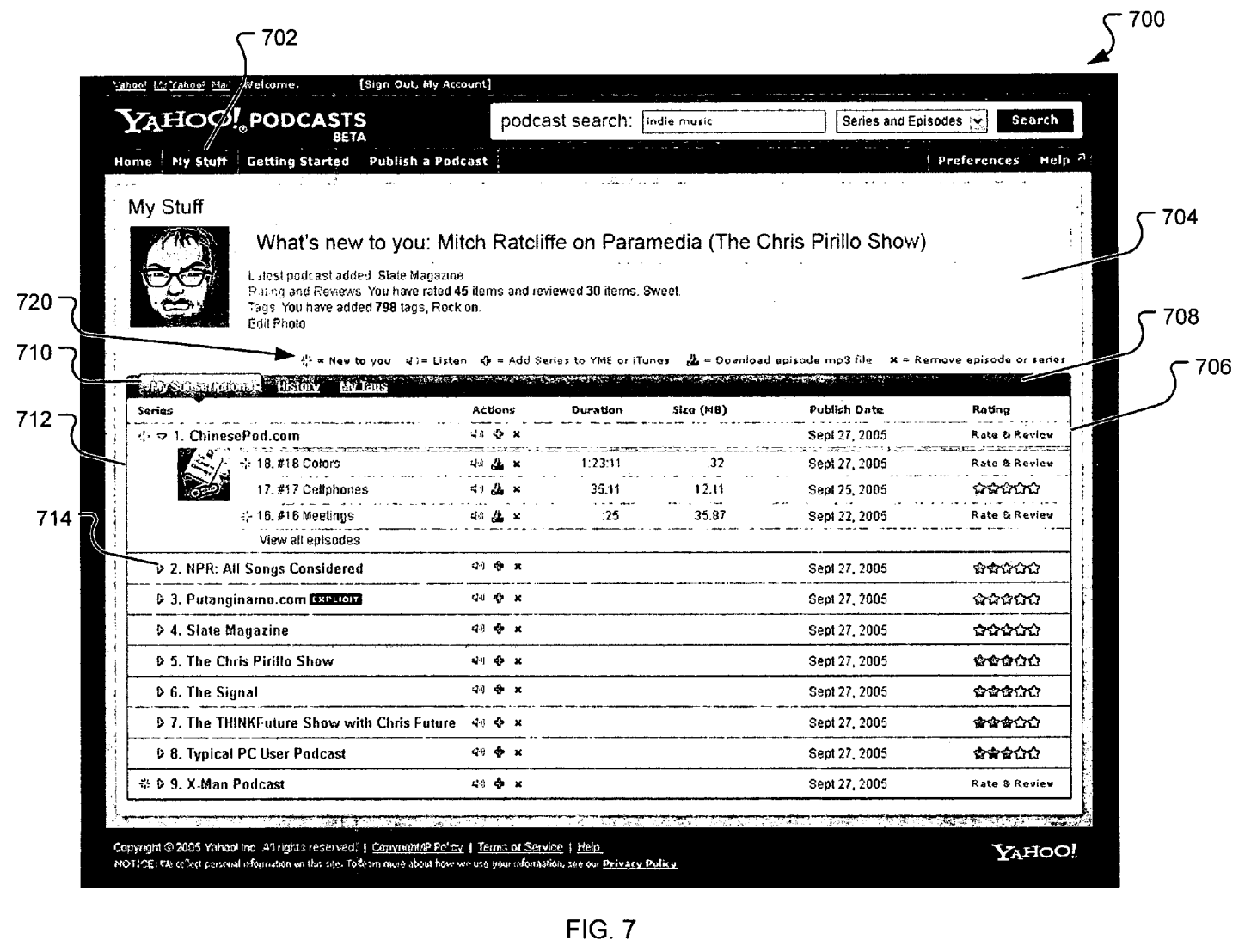

The unsubscribe request may be generated by a user selection of an unsubscribe button on a webpage, such as an unsubscribe button on the subscription control panel in FIG. 7. The request may identify information concerning the feed and the user.

In response to the request, the subscription server updates the subscription data store in an update subscription data operation 504. In the update operation 504, an indicator such as a flag is added to the subscription data associated with the unsubscribed feed so that, upon future display of the user's subscription data, the unsubscribed feed is treated as being no longer subscribed to. Thus, subscription data is not deleted and is still available for display as historical information, but the unsubscribed feed is no longer shown to the user and will no longer be displayed as a currently subscribed to feed in the subscription control panel. In an alternative embodiment, the subscription data store includes a list of currently subscribed feeds for the user and subscription data is deleted from the user's list so that only currently subscribed feeds are maintained in the list of feeds. However, a record of the user's consumption history stored elsewhere may still retain information about what episodes the user has consumed and, possibly, what subscriptions the user had at any given time.

A transmit operation 506 then transmits to the user a response that indicates that the feed is no longer subscribed to. This response may be a pop-up message that the unsubscribe command was successful or may be a revised subscription control panel showing the feed removed from the current subscriptions.

In an embodiment, the transmit operation 506 may also transmit a command to the rendering device to unsubscribe to the feed. This command may include some file, similar to a .pcast file, that is interpretable by the rendering device so as to cause the rendering device to remove the feed from its local subscription file.

Figure 6:
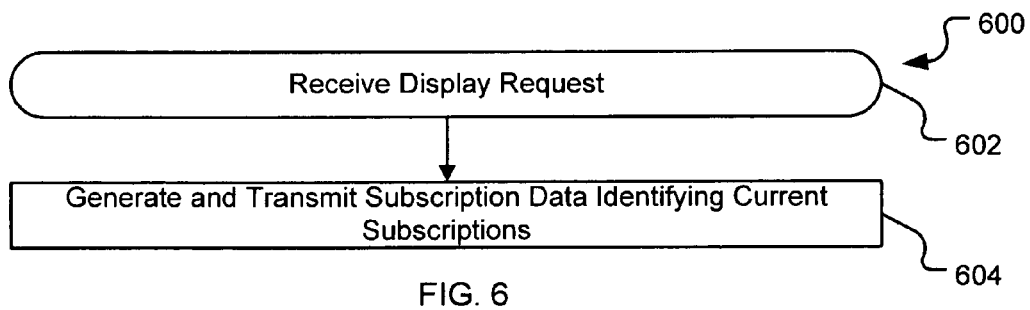
FIG. 6 is a flowchart of an embodiment of a method of managing subscriptions to feeds on remote computing devices using a subscription server.

FIG. 6 is a flowchart of an embodiment of a method of managing subscriptions to feeds on remote computing devices using a subscription server. In the embodiment, A user has previously subscribed to one or more feeds such as via the method 400 of FIG. 4 and, in the manage method 600, an display current subscriptions request is received by the subscription server from the user in a receive display request 602. To generate such a display request may require that the user first login to the user's account and select a control directing the subscription server to display current subscriptions.

Again, the request need not be received from any particular computing device, as long as the request can be associated with the user. Thus, it is possible for a user to subscribe to a feed with a first device, such as a PC computer at the user's home, and at a later date manage the subscription and render new episodes using a different device. Thus, as opposed to the client-side aggregators, the user subscription is not limited to a single device.

In response to the display request, the subscription server accesses the user's subscription data in the subscription data store (such as by using the user's login information) and generates a subscription control panel GUI in a generate and transmit operation 604. Generation of the subscription control panel GUI may also include searching for and retrieving information from each of the user's currently subscribed feeds.

In an alternative embodiment, the searching for recent information may be done periodically by the subscriptions server and the subscription data associated with the user then periodically updated. Thus, upon receipt of a display request, the subscription server can obtain recent information from the subscription data store without performing a general search of the different feeds at their remote locations.

After the GUI is generated, it is transmitted to whatever device initiated the display request. In an embodiment, the GUI is a webpage and any device with browser capability can display the GUI to the user. The GUI generated may be specific to the device or may be specific to the user based on user-defined parameters. As discussed in greater detail with reference to FIG. 7, the GUI allows the user to manage feed subscriptions, render episodes and perform other actions related to the feeds through controls on the GUI, now displayed by the user's rendering device.

FIG. 7 is an embodiment 700 of a user interface for a server-based subscription control panel. The user interface 700 shown in FIG. 7 is particular to feeds, in this case referred to as podcasts, to which the user has subscribed. To obtain the user interface 700 shown, the user first logs into the subscription engine. In an embodiment, the login may be effect through the user's access of a "podcast home" webpage and subsequent user selection of a "login" control through which the user may input a user name and password thus authenticating the user's identity. An example of a podcast home page is the main podcast search engine user interface which is discussed in greater detail in the U.S. Provisional Application No. 60/722,600, filed Sep. 30, 2005 which is incorporated by reference herein.

After authentication, the user may then select to display the user's current subscriptions, such as by selecting a control, such as the "My Stuff" tab control 702 as shown. The subscription control panel then displays the current subscription user interface 700 shown includes a first section 704 that presents the user message concerning new and recent feed information. In the embodiment shown, the first section 704 is titled "What's New To You:" and displays information to the user. In an embodiment, the first section 704 of the GUI 700 may be a standardized "logged in" user section that is consistent through the all the GUI pages shown to the user.

The information displayed in the first section 704 may be a system generated notice, such as notice of changes to the subscription engine, notice of new services, notice of an upcoming event or deadline. If the user is a member of a group, the message may be from other people in the group and related to the group's interest, such as identifying new podcasts of interest. Users may also create a profile, either actively or passively through the recording of the user's actions over time, and the message may be a message based on the user's profile as it relates to new podcasts identified on the Internet. The message may also be a message sent from the user to other users of the subscription server. In this embodiment, the user can edit the message or create canned responses to standard queries from other users such as current favorite podcast, recorded sound clip, etc. These may be generated automatically by the subscription server based on the user's history or identified by the user. The messages may be directed at the user or at other users. The information may also be information related to other users, such as messages to the user from other users, or messages from other users about podcasts or new episodes that the user has subscribed to.

In the embodiment shown, the first section 704 includes information about the latest podcast added, information about the user's generation of feedback information to the subscription server (in the form of ratings, reviews and tags provided by the user to describe content). The first section 704 may also include a photograph or avatar, as shown, that is associated with the user.

The subscription control panel 700 also includes a second section 706. The second section 706 displays different content depending on the tab selected on the second section tab bar 708. In the embodiment shown, the "My Subscriptions" tab 710 is selected and a subscription listing page associated with the tab 710 is displayed.

The subscription listing 712 includes a list of feeds currently subscribed to by the user. The user may have subscribed to the feeds shown by selecting a "subscribe" button from any one of the user interfaces provided by the subscription server having a subscribe button, such as for example a podcast search results page, a series information page, or an episode information page.

In the embodiment, the list of feeds is provided in tabular format with each feed being listed on a separate row and each row divided into columns having different information. For example, the first column, with the heading "series", provides the feed's name. The name may be that provided by the publisher of the feed and obtained from the feed file at the remote server location of the feed file. Alternatively, the name may be some name provided by the user instead of the name given by the publisher.

The first column, along with the name, also includes a dropdown control 714 associated with each feed. User selection of a dropdown control 714 causes the list to change to show the most recent episodes in the feed, as illustrated in the first feed in the listing 712. In this row, the dropdown control 712 for the feed titled "ChinesePod.com" has been selected and, in response, the most recent three episodes for the feed are listed as sub rows within the row for the feed. Three episodes are arbitrarily shown in FIG. 7 and the actual number of episodes displayed can be from one to as many episodes are in the feed based on the preferences of the creator of the display. The episode rows under the first column list such information as the episode number and the name of the episode. In an embodiment, this information is taken directly from the feed as it exists at the remote location. Below the three listed episodes is a user selectable control titled "View all episodes" which, upon selection expands the list to include all episodes currently listed in the feed. This is but one way of providing episode information and many others are possible and within the scope of the present invention.

A second column, with the heading of "actions", provides a set of user selectable controls in the form of symbols, each associated with the series or episode in its row and performing a different function when selected. A legend 720 describing the meaning of each symbol, including informational symbols that are not controls, is provided just above the very top of the second section 706. A symbol for "new to you" is provided identifying information that has been either recently received (i.e., within some period of time) or has been received since the last time the user accessed the page or server. A control for "add series to YME or iTunes" is provided that when selected causes the episode to be downloaded to the user's rendering device. One control, described as "listen", is a render control that causes an episode to be rendered. When associated with a feed, then the most recent episode may be rendered upon user selection of the render control or the user may be prompted to select an episode.

Rendering may involve transmission of a command from the subscription server to the rendering device that causes the rendering device to retrieve and render the episode's media file from the remote computing device on which the episode's media file resides. This may include the display to the user of a web player, which is a media player interface generated by the subscription server and displayed on the rendering device.

Alternatively, rendering may involve the server retrieving the episode's media file and streaming the media file to the rendering device. As the media data is received, the media data is rendered by the rendering device allowing the rendering device to begin rendering as soon as the first media data is received.

In addition to causing the rendering of the media file (located at or accessible via the remote computing device) by the rendering device of the user, the render control also generates render data that is recorded by the subscription server. The render data indicates that the user rendered the episode and possibly includes the date the user rendered the episode and any user comments, rating or reviews obtained at that time (such as through the web player interface). This render data then is stored in the subscription data store as part of the user's subscription history, which can be accessed via the subscription history user interface discussed with reference to FIG. 8.

Another control is an "add a series" to a rendering device control. User selection of this control may result in the generation of a .pcast file and it transmission to the rendering device currently in use by the user. Note that this allows the user to subscribe via the subscription server to a podcast and, at some later date, subscribe to the podcast again with a rendering device without ever using the rendering device's subscription interface.

Another control is "remove episode or series" which results in the associated episode or series being removed from the listing 706. This control does not, however, remove any data from the subscription data store, only revises the data so that information is not displayed to the user in future generations of the subscription control panel. Note that selection of a "remove episode or series" control associated with a feed is also an unsubscribe request. As discussed above, an unsubscribe request in addition to revising the information displayed to the user may also generate an unsubscribe command from the subscription server which is then transmitted to the user's rendering device.

Another control, this one associated only with episodes, is a "download" control. User selection of this control causes the associated episode to be downloaded to the device the user is currently using to communicate with the subscription server.

In the embodiment shown, other columns are provided that are associated only with episodes. These are a column titled "duration" and another titled "size". These columns may only be shown if at least one dropdown control 714 for a feed has been selected. Otherwise, the columns may be hidden as they are not relevant to a feed.

Another column titled "publish date" is provided showing the publication date, in the example shown, of the most recent episode.

Yet another column is also provided titled "Rating". In the example shown, this column contains either the user previously entered rating for the associated series or episode in the form of a five star rating or a prompt control titled "Rate and Review" indicating that the user has not rated this content as yet. User selection of the Rate and Review prompt control will bring up a second user interface in which the user may rate the content and provide a description in the form or prose or tags or both.

Another symbol used in the listing 706 is a "New to you" symbol. In FIG. 7, the new to you symbol is the first entry, i.e., the leftmost character, in the listing 706 if there is new content. New content may be determined as new since the last time the user logged in and viewed the subscription control panel, e.g., the last time the control panel was generated by the subscription server. Alternatively, new content may be content new since the user subscribed to a feed but that the user has yet to render via the subscription control panel.

Figure 8:
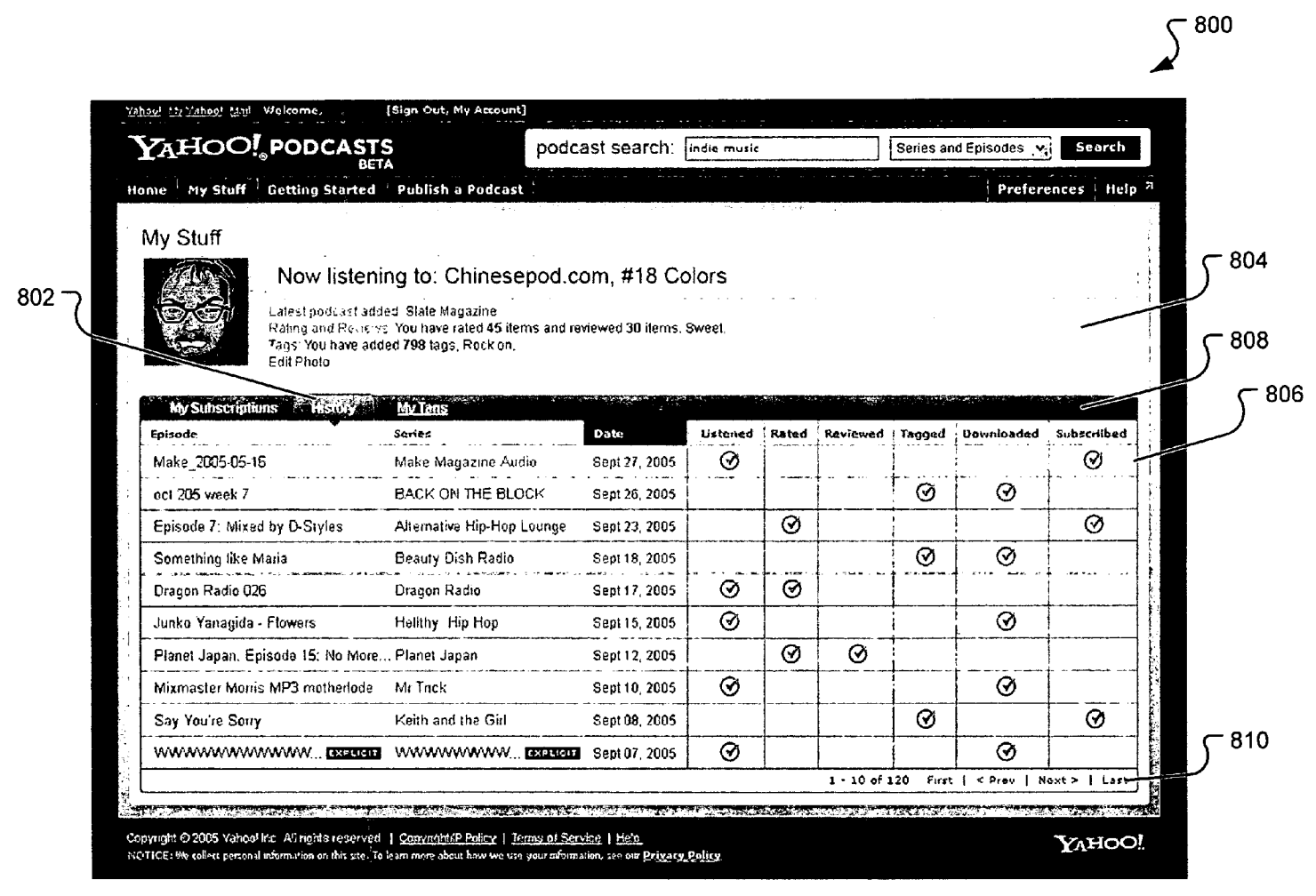

FIG. 8 is an embodiment 800 of a subscription history user interface for a server-based subscription control panel. The subscription history shown is a representation of the actions performed by the user via any one or more of the user interfaces provided by the subscription server, such as via selection of "listen", "download", "subscribe", and "rate" buttons. The subscription history user interface 800 is also divided into the first section and the second section. In the embodiment shown, the first section 804 displays similar information as described with reference to FIG. 7 except that a current status message is displayed indicating what episode the user is currently listening to.

The second section now displays a subscription history listing 806, in response to a user selection of the "History" tab 802 on the second section tab bar 808. The history listing 806 is divided into rows and columns. Each row displays a different episode that was rendered by the user via the subscription control panel in the past.

In the embodiment shown, a first column is provided with the heading titled "Episode". Under this column, the titles of the episodes rendered appear in each row below the header row. A second column, titled "Series", identifies what series the episode is a part of. A third column, titled "Date", indicates the date that the episode was rendered. In an alternative embodiment, the date and time may be tracked and displayed.

The remaining six columns illustrated in the history listing 806 are associated with the users feedback concerning the rendered episodes, and are referred to as feedback columns. The maintainers of the subscription server desire to obtain as much information from users as possible regarding the content accessible through the subscription server. This information may be used to provide better search information, such as via user-generated descriptions, tags, rating and reviews of the content. In addition, overall quality of specific content can be determined by tracking and correlating user ratings so that the relative quality of various content can be ascertained.

The first feedback column is titled "Listened" and indicates, in this case through a checkmark symbol, whether the user has rendered the episode associated with that row. As shown, not every row may indicate that the user has listened to the episode, as any of at least the six actions corresponding to the six feedback columns may result in the episode be listed in the history listing 806.

The second feedback column is titled "Rated" and indicates whether the user has rated the episode. The third feedback column is titled "Reviewed" and indicates whether the user has reviewed the episode. The fourth feedback column is titled "Tagged" and indicates whether the user has tagged the episode. The fifth feedback column is titled "Downloaded" and indicates whether the user has downloaded the episode. The sixth feedback column is titled "Subscribed" and indicates whether the user has subscribed, using the subscription server, to the feed of which the episode is a part.

Of the six feedback columns, the user is not allowed to directly edit any data. New data can be added but the data will be in a new entry reflecting the date the action, e.g., rating, tagging, listening, downloading, etc., was performed. In one embodiment, the user can easily do this by selecting the location where a checkmark should be. This will bring up the appropriate interface to allow the user to subscribe, rate, review, etc. the associated episode.

In another embodiment (not shown), a user may alter the display characteristics to display only one row per episode, and thus combine the actions into one row. In this embodiment, the history listing 806 will not include a date column, but may include each of the other columns. Episodes may then be sorted alphabetically or by series, as directed by the user.

The bottom of the second section includes a page navigation bar 810 that indicates approximately how many pages of history there are in the history listing 806, and provides controls (e.g., first page, previous page, next page, last page) for displaying the pages of the history listing easily.

The order of display may be sorted via user controls on the user interface 800. For example, a user may sort the data alphabetically be episode or series or by date (as illustrated). Other methods of sorting are also contemplated such as by user rating or by overall community rating.

Figure 9:
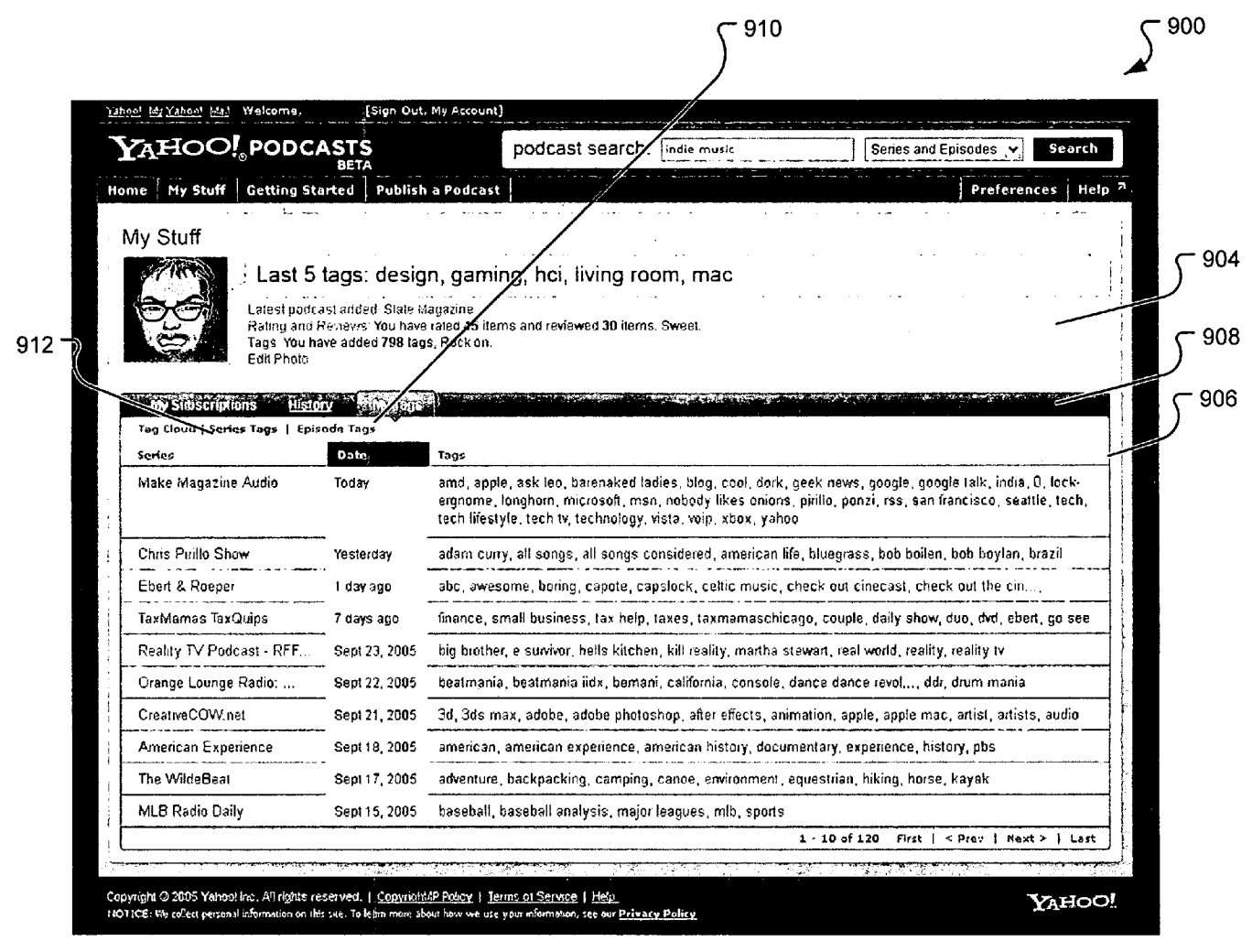

FIG. 9 is an embodiment 900 of a tag history user interface for a server-based subscription control panel. The tag history user interface is provided to allow users to easily tag episodes. The maintainers of the subscription server desire to obtain as much information from users as possible regarding the content accessible through the subscription server. This information may be used to provide better search information, such as via user-generated descriptions, tags, rating and reviews of the content.

The tag history user interface 900 is also divided into the first section and the second section similar to the current subscription user interface 700. In the embodiment shown, the first section 904 displays similar information as described with reference to FIG. 7 except that a current status message is displayed indicating the last five tags input by the user to describe episodes or feeds.

The second section now displays a tag history listing 906, in response to a user selection of the "my tags" tab 902 on the second section tab bar 908. The tag history listing 906 is divided into rows and columns. Each row displays a different series (as shown) or episode that was rendered by the user via the subscription control panel in the past. The user may toggle the view between series and episodes using the "Series Tags" display control 912 (currently selected) and "Episode Tags" display control 910 at the top of the second section 906.

In addition to a first column titled "Series", a second column titled "Date" identifies the date the most recent episode of the series was rendered. The third column, titled "Tags", includes all the tags entered by the user to describe, in the example shown, the series. In another embodiment, the tags shown for the series may be the collection of all tags entered for each of the constituent episodes of a series.

Not shown in FIG. 9 is the "Episode Tags" history listing that would be displayed upon user selection of the "Episode Tags" display control 910 at the top of the second section 906. The episode tag history listing will appear similar to the series listing 900 except that the first column heading will be "Episode" rather than "Series" and the tags displayed will be tags associated only with the episode by the user.

Figure 10:
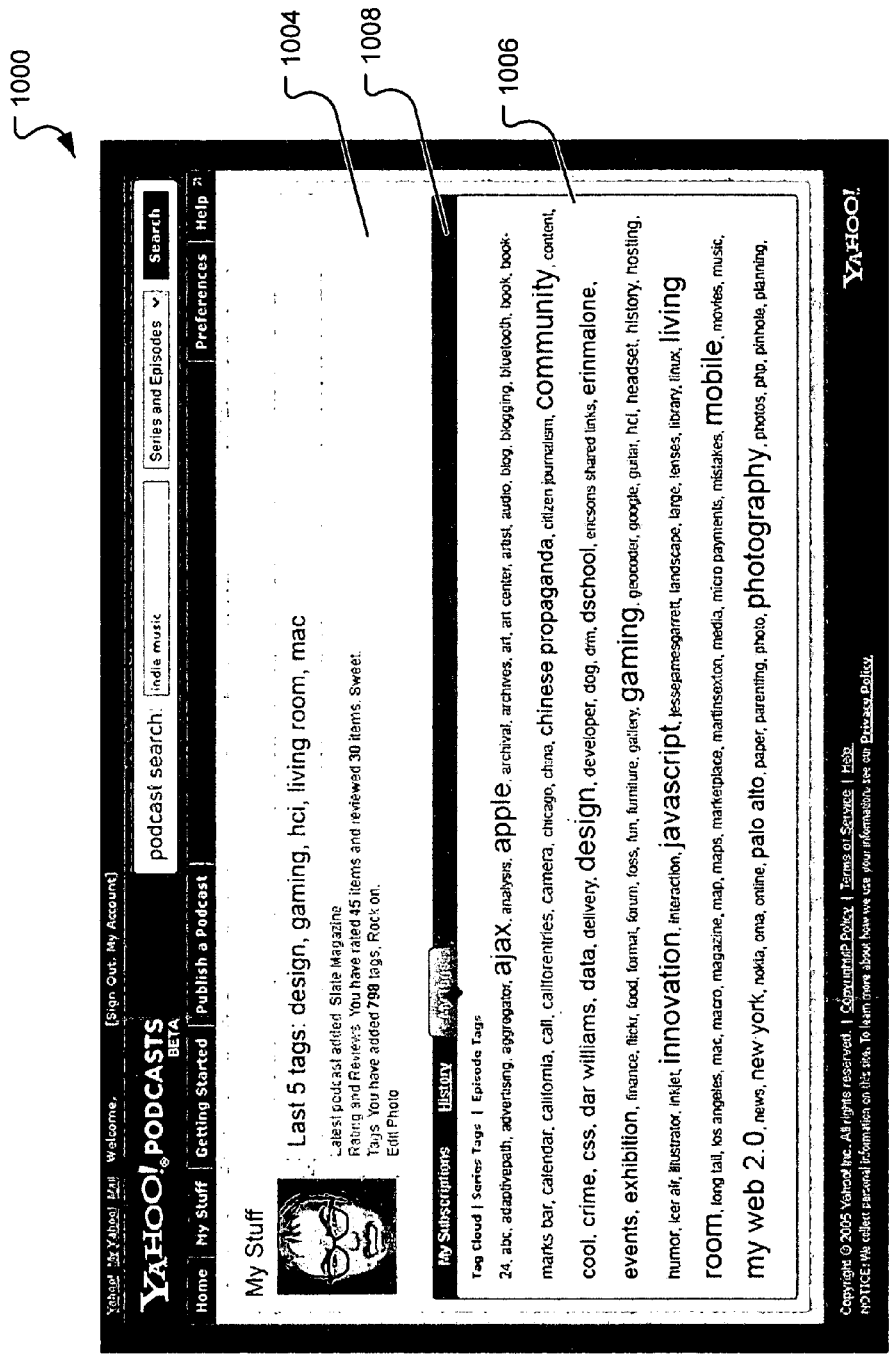
FIG. 10 is an embodiment of a tag cloud user interface for a server-based subscription control panel.

FIG. 10 is an embodiment 1000 of a tag cloud user interface for a server-based subscription control panel. The tag cloud user interface is provided to allow users to easily tag episodes. The tag cloud user interface 1000 is also divided into the first section and the second section similar to the current subscription user interface 700. In the embodiment shown, the first section 1004 displays similar information as described with reference to FIG. 7 except that a current status message is displayed indicating the last five tags input by the user to describe episodes or feeds.

The second section 1006 is referred to as a tag cloud. In the tag cloud, tags are displayed in one of a predetermined number of font sizes. In the embodiment shown, there are five font sizes used to distinguish the tags. The larger the font size the greater the number of times the tags have been entered by the user to describe any content—hence the description of this page as "My Tags." For the purposes of this specification, the number of times a tag has been entered by a user is referred to as the "tag density." Thus, the lowest tag density is one in that if a tag has a tag density of zero, then it has not been used and is therefore not a tag.

In one embodiment, the tags used by the user are separated into five density categories ranging from tags used the most to tags used the least. The five categories may not be equivalent, in that the lowest category may contain only those tags used once. In one embodiment, to calculate the categories the range is determined between the lowest tag density and the highest tag density. The range is then divided into five groups. The size of the groups may be determined by a number of factors. For example, as larger fonts take up more space, an absolute limit may be set for the number of tags in the highest density category, such as 10. In an alternative example, there may be some ratio set between the number of tags in the highest density category and the number of tags in the other categories combined to prevent the impression that there are too many overused tags. As another example, it may be determined that if there are very few tags (such as less than 20) and a limited range (such as between density of one and 5) fewer categories are used than five, such as two or three, and the categories are not illustrated by the extreme font sizes, but by the middle font sizes.

Distribution of the tag density may also affect how the density categories are selected. For example, it has been determined that the lower density tags are more common than the higher density tags in something close to an exponential decay. In order to compensate for this, the size of the lowest density category may be increased so that fewer tags are in the higher density categories.

In the embodiments shown in FIGS. 7-10, the various entries in the user interfaces may be controls that, when selected, bring up an interface associated with the identified series, episode, tags, reviews, etc. For example, on FIG. 8 each row of the history listing 806 includes a name of the episode in the first column and a name of the series in the second column. In both cases, the names are link controls that when selected bring up a user interface providing further information about the episode or the series, referred to as the episode page and the series page respectively. These pages provide further information about the episode or series and additional controls such as listen controls, tag controls, rate and review controls, and other users' descriptions, tags and ratings of the content.

Figure 11:
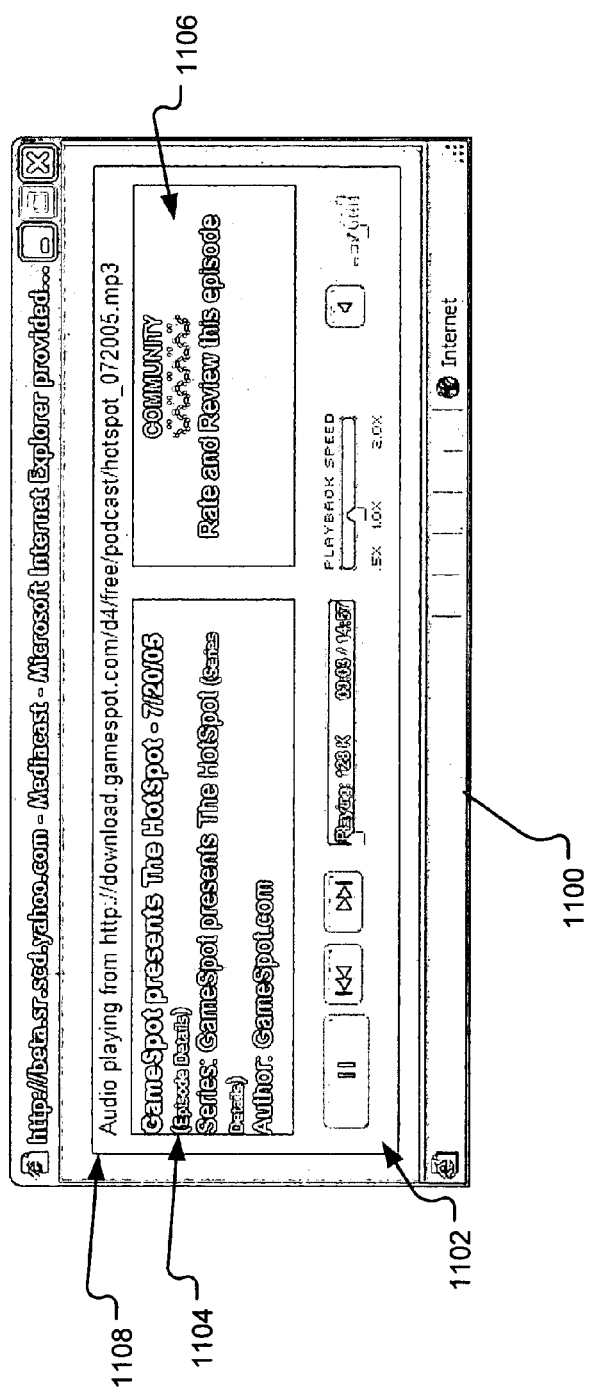
FIG. 11 is an embodiment 1100 of a user interface for a web player that is opened in response to pressing a listen button according to one embodiment of the present invention.

FIG. 11 is an embodiment 1100 of a user interface for a web player that is opened in response to pressing a listen button according to one embodiment of the present invention. The web player GUI 1100 includes a controls area 1102 containing various media player controls such as a volume control, a mute button, play/pause button, a fast forward button and a reverse button. A slider is also provided to allow the user to play from different locations within the file. A second slider is provided to allow the user to change the speed of the playback.

The web player GUI 1100 also includes an episode information area 1104. The area 1404 includes information such as the title of the episode, the series to which the episode belongs, and the author. Different media players will provide different amounts of information to the user.

In the web player GUI 1100 shown, the GUI 1100 differs from typical media players in one way in that it also includes a data entry area 1106. This area allows the user to enter and submit data to the feed database 174 or the subscription data store. Thus, a user via the media player 1100 can both listen to an episode and submit data about the episode to the feed database 174.

In an embodiment, the web player as shown is a executable program module that is transmitted from the subscription server to the rendering device. The program module is then interpreted by the rendering device, e.g., by a browser on the rendering device, to display the GUI 1100 and retrieve and render the appropriate media file from the remote computing device upon which the episode is located.

Figure 12:
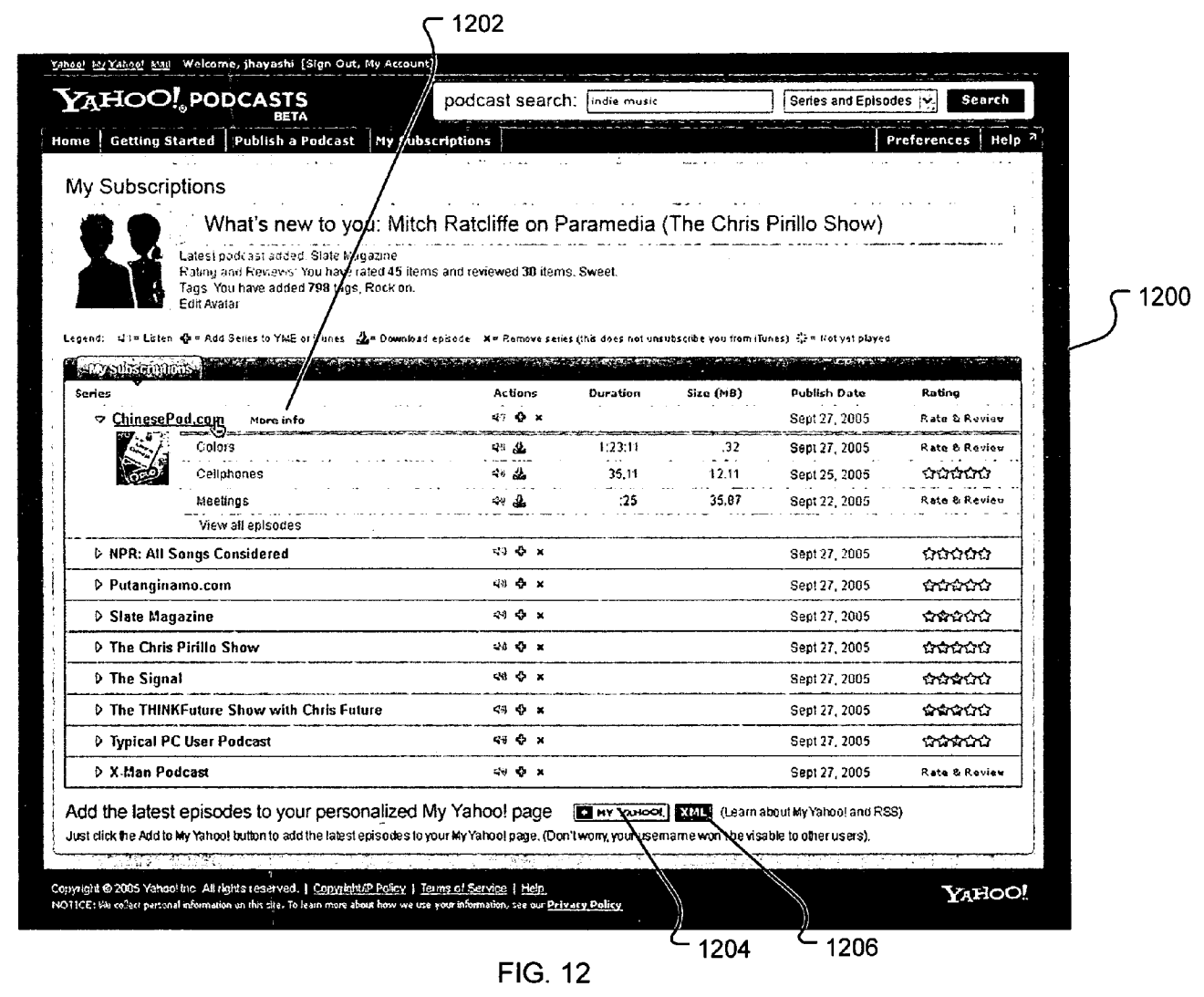

FIG. 12 is an alternative embodiment 1200 of a "My Subscriptions" user interface for a server-based subscription control panel. The user interface 1200 includes many common elements with the embodiment shown in FIG. 7. Among the differences, however, is a "More Info" control 1202 associated with a feed description. The More Info control 1204, when selected, causes the series page for the series to be generated and transmitted to the user's device for display to the user.

Another difference is an "Add to My Yahoo!" control 1204. This control, when selected, causes the latest episodes to be automatically added to another content page associated with the user. In one embodiment, the content page is a user-created content page, e.g., a personalized user home page containing digital content, such as links to news articles, music, video and episodes. Such a home page may be created by the user selecting digital content from a list of content in order to create a personalized page displaying only selected information of interest to the user. Thus, the "Add to My Yahoo!" control 1204 is a control that automatically places an episode onto a previously defined user home page.

The user interface 1200 in FIG. 12 also includes an "XML" control that exports the entire subscription list shown in the user interface 1200 to a user's rendering device. In an embodiment, user selection of this control causes the user's rendering device to subscribe to all the subscriptions shown in the "My Subscriptions" list, if the device is not already subscribed. This may be achieved by the subscription server generating a file, such as a .pcast containing all the subscription information, and transmitting the file to the user's rendering device. This control 1206 permits a user to easily revise the user's rendering devices to be current with the user's selections on the subscription server.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A system comprising:
    a subscription engine implemented on a server configured to communicate with rendering devices over a network, the subscription engine configured to receive feed subscription requests from a user via a first rendering device in communication with the server; and
    a subscription data store in communication with the server, the subscription data store comprising subscription information associated with the user, wherein the subscription information identifies one or more feeds that the user is currently subscribed to and comprises user-generated directions received by the server, the feeds being accessible at remote computing devices;
    wherein each of the subscription requests comprises a request to monitor the feed for the addition of new episodes, the new episodes being accessible at one or more remote computing devices, and
    wherein the subscription information identifies a list of currently subscribed feeds based on feed subscription requests received by the server from the user, a history of episodes rendered by the user as a result of render requests received by the server from the user, and display information to selectively display subscription information.

2. The system of claim 1 wherein the subscription engine is further configured to generate, based on the subscription information and the one or more feeds accessible at remote computers, an interface for display on the rendering device to the user, wherein the interface identifies at least one feed the user being currently subscribed to and includes at least one render control that allows a user to cause an episode of the at least one feed to be rendered on the rendering device, and wherein user selection of the at least one render control causes render data to be stored in the subscription data store as subscription information associated with the user.

3. The system of claim 1 wherein the interface for display on the rendering device to the user further comprises an unsubscribe control associated with the at least one feed, a user selection of the unsubscribe control causing subscription information associated with the user in the subscription data store to be updated to indicate that the user is no longer subscribed to the at least one feed associated with the selected unsubscribe control.

4. The system of claim 1 wherein the subscription engine is further configured to generate and transmit information to a browser on the rendering device, the information being interpretable by the browser of the rendering device to retrieve an episode from a remote computing device and render the episode to the user.

5. The system of claim 2 wherein the interface for display on the rendering device is a web page generated by the subscription engine and transmitted to a browser on the rendering device for interpretation and display.

* * * * *